US009900469B2

United States Patent
Shionoiri et al.

(10) Patent No.: US 9,900,469 B2
(45) Date of Patent: Feb. 20, 2018

(54) IMAGE FORMING APPARATUS

(71) Applicant: FUJI XEROX CO., LTD., Tokyo (JP)

(72) Inventors: Hirochika Shionoiri, Kanagawa (JP); Manabu Iwasaki, Kanagawa (JP); Fumihisa Suzuki, Kanagawa (JP); Naoya Konita, Kanagawa (JP); Shinji Akahira, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 15/355,156

(22) Filed: Nov. 18, 2016

(65) Prior Publication Data

US 2017/0331981 A1 Nov. 16, 2017

(30) Foreign Application Priority Data

May 11, 2016 (JP) .................................. 2016-095677

(51) Int. Cl.
*G06F 1/04* (2006.01)
*H04N 1/44* (2006.01)
*G06F 21/31* (2013.01)
*H04N 1/00* (2006.01)

(52) U.S. Cl.
CPC ........... *H04N 1/4413* (2013.01); *G06F 21/31* (2013.01); *H04N 1/00344* (2013.01); *H04N 1/00832* (2013.01); *H04N 1/4433* (2013.01); *H04N 2201/0094* (2013.01)

(58) Field of Classification Search
CPC .... G06F 3/0346; G06F 3/1222; G06F 3/1238; G06F 3/1267; G06F 3/1288; G06F 19/322; G06F 21/6245; G06F 2221/2129; H04N 2201/0094; H04N 1/00244; H04N 1/0035; H04N 1/00408; H04N 1/00411

USPC ............... 358/1.14, 1.15; 726/3, 7, 18, 19, 5
See application file for complete search history.

(56) References Cited

U.S. PATENT DOCUMENTS

| 6,681,029 B1* | 1/2004 | Rhoads | G06F 17/30876 |
|---|---|---|---|
| | | | 375/E7.026 |
| 7,058,697 B2* | 6/2006 | Rhoads | G06F 17/30876 |
| | | | 380/216 |
| 7,266,215 B2* | 9/2007 | Ikenoue | G06T 1/0021 |
| | | | 283/902 |
| 8,913,787 B2* | 12/2014 | Hoover | G06K 9/00442 |
| | | | 382/103 |

(Continued)

FOREIGN PATENT DOCUMENTS

| JP | 2005-271317 | 10/2005 |
|---|---|---|
| JP | 2011-227928 | 11/2011 |

OTHER PUBLICATIONS

Abstract and machine translation of JP 2011-227928.

*Primary Examiner* — Negussie Worku
(74) *Attorney, Agent, or Firm* — Fildes & Outland, P.C.

(57) ABSTRACT

There is provided an image forming apparatus. A storage unit stores a second table tabulating a usage amount when a user uses an apparatus for each identifier for tabulation separately from a first table in which user information is registered for each identifier for authentication of the user. A reception unit receives a user identifier. A registration unit registers the user identifier in the second table as an identifier for tabulation, when the received user identifier establishes an authentication by a verification in the identifier for authentication registered in the first table, and is not registered in the second table.

4 Claims, 5 Drawing Sheets

(56) References Cited

U.S. PATENT DOCUMENTS

| | | | |
|---|---|---|---|
| 2005/0216514 A1 | 9/2005 | Murata | |
| 2008/0021834 A1* | 1/2008 | Holla | G06F 19/322 |
| | | | 705/51 |
| 2008/0189775 A1* | 8/2008 | Fujita | G06F 21/34 |
| | | | 726/7 |
| 2010/0302573 A1* | 12/2010 | Hakozaki | G06F 3/1204 |
| | | | 358/1.14 |
| 2010/0332823 A1* | 12/2010 | Tsujimoto | G06F 21/629 |
| | | | 713/155 |
| 2011/0029878 A1* | 2/2011 | Matsumoto | H04N 1/00928 |
| | | | 715/733 |
| 2011/0099626 A1* | 4/2011 | Tsujimoto | H04N 1/00344 |
| | | | 726/18 |
| 2013/0167217 A1* | 6/2013 | Inomata | G06F 21/41 |
| | | | 726/8 |
| 2015/0121542 A1* | 4/2015 | Kinoshita | G06F 21/608 |
| | | | 726/27 |
| 2015/0371292 A1* | 12/2015 | Akutsu | G06Q 30/0283 |
| | | | 705/400 |
| 2017/0094447 A1* | 3/2017 | Sasaki | G06F 21/41 |

* cited by examiner

*FIG. 2A*

212: MAIN TABULATION TABLE

| USER ID | DEPARTMENT CODE | SELECTION DEPARTMENT CODE | ADDITIONNAL FLAG |
|---|---|---|---|
| USER A | DEPARTMENT A, DEPARTMENT B | | |
| USER B | DEPARTMENT A | | |
| USER C | DEPARTMENT B | | |
| USER D | DEPARTMENT C | | |
| USER F | DEPARTMENT D | | |
| ⋮ | ⋮ | ⋮ | ⋮ |

212a = USER ID, 212b = DEPARTMENT CODE, 212c = SELECTION DEPARTMENT CODE, 212d = ADDITIONNAL FLAG

| USER ID | DEPARTMENT CODE | SELECTION DEPARTMENT CODE | ADDITIONNAL FLAG |
|---|---|---|---|
| USER A | DEPARTMENT A, DEPARTMENT B | DEPARTMENT A | |
| USER B | DEPARTMENT A | | |
| USER C | DEPARTMENT B | | |
| USER D | DEPARTMENT C | | |
| USER E | VISITOR | | YES |
| USER F | DEPARTMENT D | | |
| ⋮ | ⋮ | ⋮ | ⋮ |

FIG. 3

213: TABULATION TABLE FOR EACH DEPARTMENT

| DEPARTMENT CODE | USAGE AMOUNT |
|---|---|
| DEPARTMENT A | 550 |
| DEPARTMENT B | 740 |
| ⋮ | ⋮ |

FIG. 4

214: TABULATION TABLE FOR EACH USER

| USER ID | RESTRICTION | USAGE AMOUNT |
|---|---|---|
| USER A | | 70 |
| USER B | | 33 |
| USER C | | 54 |
| USER D | | 98 |
| USER E | ONLY BLACK-AND-WHITE | 29 |
| USER F | | 105 |
| ⋮ | ⋮ | ⋮ |

IMAGE FORMING APPARATUS

CROSS-REFERENCE TO RELATED APPLICATIONS

This application is based on and claims priority under 35 U.S.C. §119 from Japanese Patent Application No. 2016-095677 filed on May 11, 2016.

TECHNICAL FIELD

The present invention relates to an image forming apparatus.

SUMMARY

According to the aspect of the embodiments of the present invention, there is provided an image forming apparatus including a storage unit that stores a second table tabulating a usage amount when a user uses an apparatus for each identifier for tabulation, separately from a first table in which user information is registered for each identifier for authentication of the user, a reception unit that receives a user identifier, and a registration unit that registers the user identifier in the second table as an identifier for tabulation, when the received user identifier is established an authentication by a verification of the identifier for authentication registered in the first table, and is not registered in the second table.

BRIEF DESCRIPTION OF THE DRAWINGS

Exemplary embodiments of the present invention will be described in detailed based on the following figures, wherein:

FIGS. 2A and 2B illustrate an example of a main tabulation table configuring a user dB for tabulation, FIG. 2A is a view illustrating before updating, and FIG. 2B is a view illustrating after updating;

FIG. 3 is a view illustrating an example of a tabulation table for each department configuring the user DB for tabulation;

FIG. 4 is a view illustrating an example of a tabulation table for each user configuring the user DB for tabulation;

DETAILED DESCRIPTION

Figure 1:
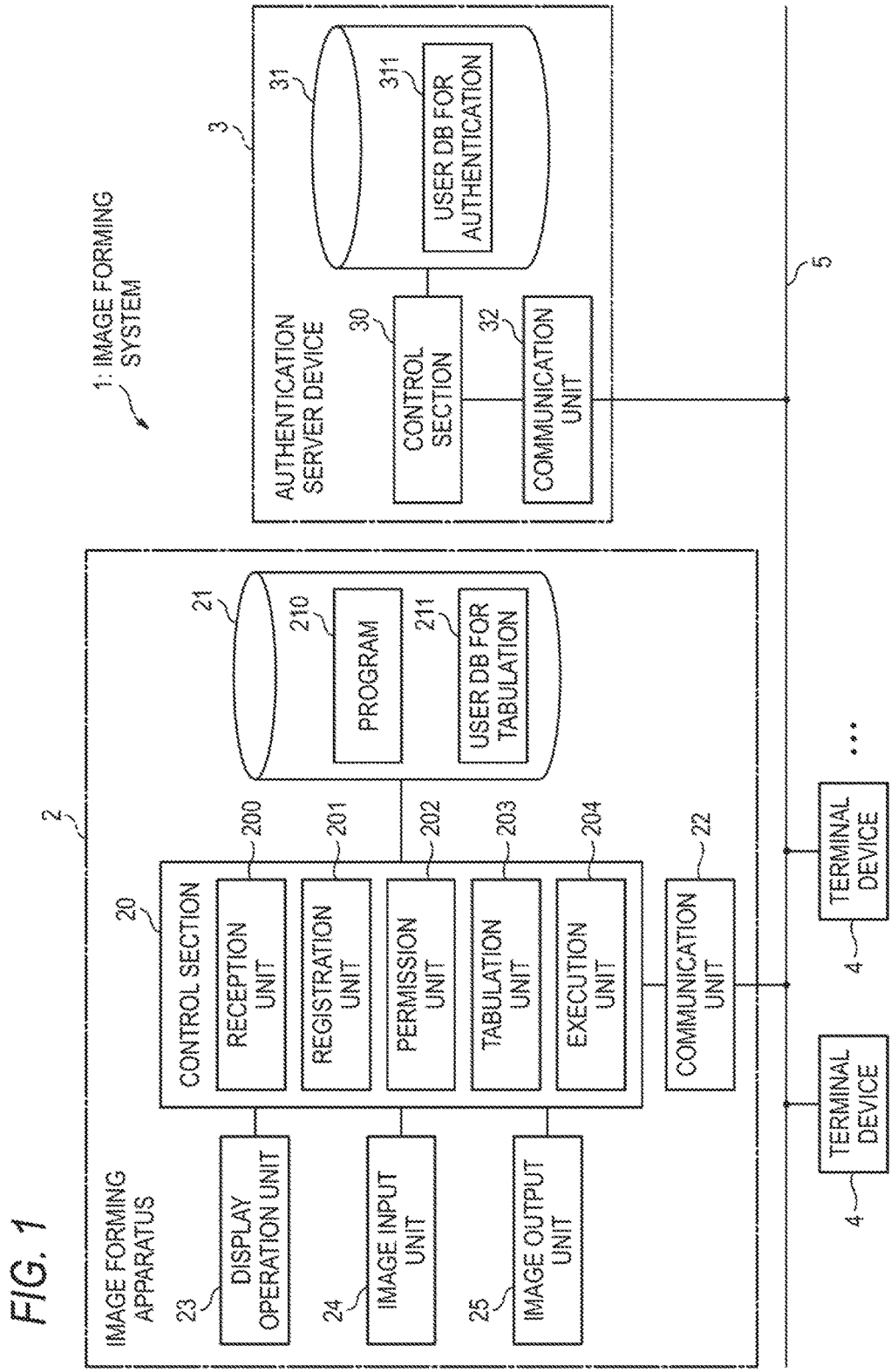
FIG. 1 is a block diagram illustrating a schematic configuration example of an image forming system according to a first exemplary embodiment of the invention.

Hereinafter, an exemplary embodiment of the invention will be described with reference to the drawings. Components baying substantially the same functions are denoted by the same reference numerals in the drawings, and repeated descriptions will be omitted.

First Exemplary Embodiment

FIG. 1 is a block diagram illustrating a schematic configuration example of an image forming system according to a first exemplary embodiment of the invention.

In the image forming system 1, an image forming apparatus 2, an authentication server device 3, and plural terminal devices 4 used by a user are connected to each other via a network 5. The image forming system 1 manages a user database for tabulation (DB) 211 tabulating usage amounts of document by the image forming apparatus 2, and manages a user database for authentication (DB) 311 to authenticate the user by the authentication server device 3. A user is one example of the user. A user DB for authentication 311 is one example of a first table. A user DB for tabulation 211 is one example of a second table.

The image forming apparatus 2, for example, is a multi-function machine provided with plural functions, such as copying, scanning, and printing. The image forming apparatus 2 has a control section 20 that controls each part of the image forming apparatus 2. A storage unit 21, a communication unit 22, a display operation unit 23, an image input unit 24, and an image output unit 25 are connected to the control section 20. Detailed configurations of each part of the image forming apparatus 2 will be described later.

The authentication server device 3 is configured to include the control section 30 performing authentication processing with respect to the user, the storage unit 31 in which the user DB for authentication 311 is stored, and the communication unit 32 connected to the network 5. The user B for authentication 311 is a DB to manage user information related to the user for each user ID. The user ID is an example of a user identifier. The user information includes a password, a full name, and a department to which the user belongs, in addition to the user ID. The department is an example of an organization. The organization may be a group or a project, in addition to the department.

The terminal device 4 includes a control section configured of a central processing unit (CPU) and an interface and which controls each part of the terminal device 4, a storage unit configured of a read only memory (ROM), a random access memory (RAM), and a hard disk, an input unit configured of a keyboard and a mouse, a display unit configured of a liquid crystal display, and the communication unit connected to the network 5. If the terminal device 4 is accessible to the image forming apparatus 2 via the network 5, the terminal device 4 may be a multifunction phone (smart phone) and a cellular phone, in addition to a personal computer or a tablet computer.

The network 5 is a communication network such as a local area network (LAN) and the Internet performing transmission and reception of data through wired communication and wireless communication.

(Configuration of the Image Forming Apparatus)

The storage unit 21 of the image forming apparatus 2 is realized by a read only memory (ROM), a random access memory (RAM), and a hard disk, and stores a program 210, and the user DB for tabulation 211.

The display operation unit 23 has a touch panel display in which a polymer-based touch panel is disposed in a display unit such as a liquid crystal display. The display operation unit 23 displays an operation screen on the display unit, and receives an operation on the touch panel from an operator.

The image input unit 24 is a unit which performs read processing of an original document, and for example, is provided with an auto document feeder device disposed on a document stand and a scanner, reads in and inputs a read image from an original document placed on the document stand, or an original document fed by an auto document feeder device. The image output unit 25, for example, has an image holding member by a photoreceptor body, forms and outputs an image on a recording medium such as a sheet.

The control section 20 is configured of a central processing unit (CPU) and an interface. The CPU operates in accordance with the program 210 stored in the storage unit 21. Therefore, the CPU functions as a reception unit 200, a registration unit 201, a permission unit 202, a tabulation unit 203 and an execution unit 204.

The user DB for tabulation 211 that the storage unit 21 stores includes the main tabulation table 212 (refer to FIGS. 2A and 2B), a tabulation table for each department 213 (refer to FIG. 3), and a tabulation table for each user 214 (refer to FIG. 4). A detailed configuration of these tables 212, 213, and 214 will be described later.

The reception unit 200 receives a user authentication request from the terminal device 4 or the display operation unit 23, and receives a job after the authentication is established. The job is an example of processing instruction information. The job is a copying job in which copying is executed, a scanning job in which scanning is executed, and a printing job in which printing is executed. The copying job and the scanning job are jobs that the user directly instructs with respect to the display operation unit 23 of the image forming apparatus 2. The printing job is a job that is instructed from the terminal device 4.

The registration unit 201 registers the user ID in the user DB for tabulation 211 and registers information indicating that the department code of the user or the user does not belong to any department based on the user information in the user DB for tabulation 211, when the user ID which is received by the reception unit 200 establishes an authentication by a verification in the user DB for authentication 311, and is not registered in the user DB for tabulation 211.

The permission unit 202 permits use of the apparatus 1 in a range of restricted information previously set for the user, with respect to the user ID in which flag information is registered by the registration unit 201.

The tabulation unit 203 performs tabulation processing of the usage amounts of document of the user with respect to the user ID registered in the user DB for tabulation 211.

The execution unit 204 executes processing in accordance with the job received by the reception unit 200. In a case where the job received by the reception unit 200 is a copying job, the execution unit 204 causes the image input unit 24 to read the original document to generate a read image, and to print and output the read image on a sheet using the image output unit 25. In a case Where the job received by the reception unit 200 is a scanning job, the execution unit 204 holds the read image read by the image input unit 24 inside of the image forming apparatus 2, or transfers the read image to the terminal device 4. In a case where the job received by the reception unit 200 is a printing job, the execution unit 204 prints and outputs image data transmitted from the terminal device 4 on the sheet using the image output unit 25. An aggregated document usage amount corresponding to the copying job, the scanning job, and the printing job is registered in the user DB for tabulation 211 by the tabulation unit 203.

Each of the reception unit 200, the registration unit 201, the permission unit 202, the tabulation unit 203, and the execution unit 204 may be partially or entirely configured of a hardware circuit, such as a reconfigurable circuit (field programmable gate array: FPGA) and an application specific integrated circuit (ASIC).

Operation of the First Exemplary Embodiment

Figure 5:
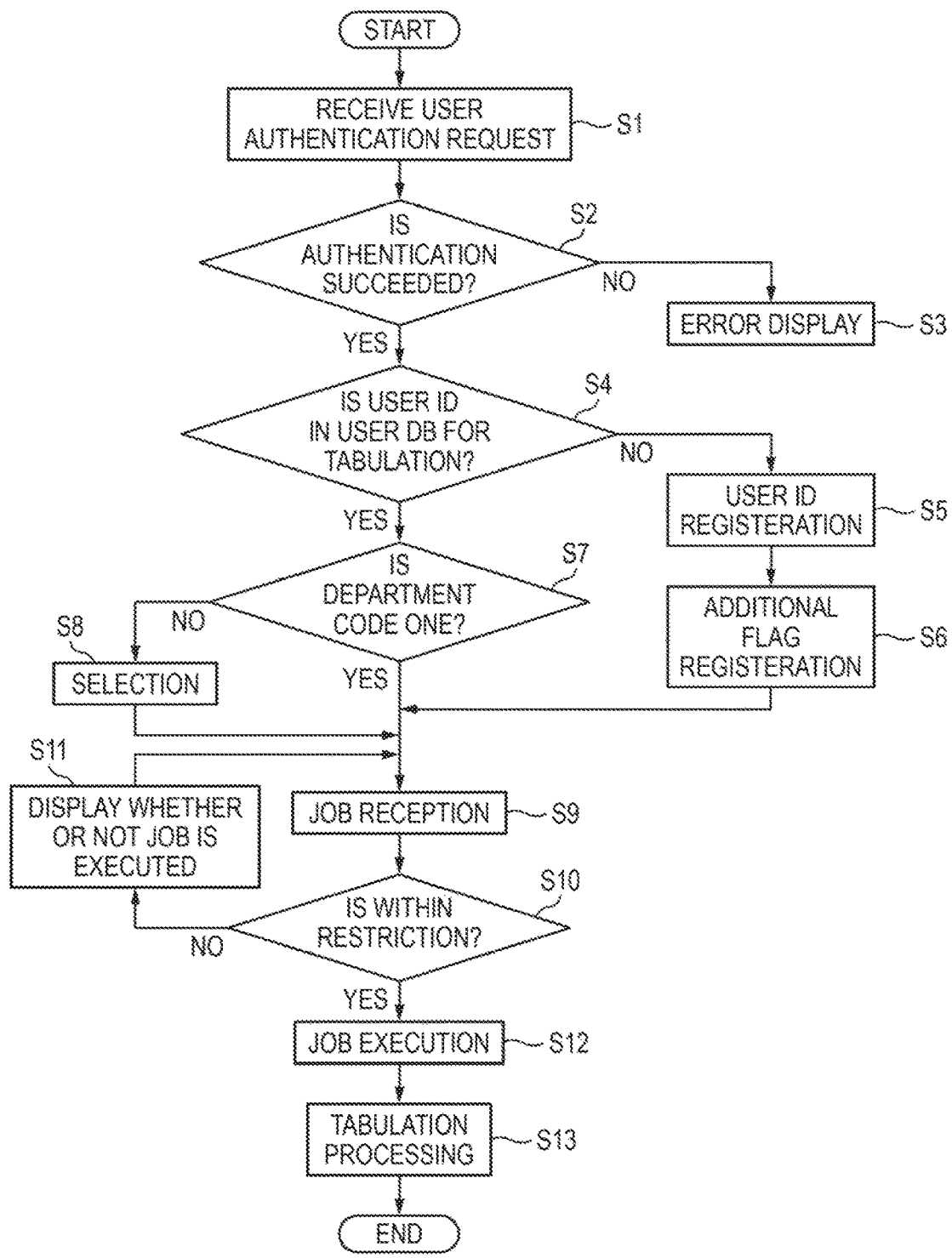
FIG. 5 is a flowchart illustrating an example of an operation of an image forming apparatus according to the first exemplary embodiment.

An example of an operation of the image forming system 1 according to the exemplary embodiment will be described with reference to FIGS. 2A to 5. FIG. 5 is a flowchart illustrating an example of an operation of the image forming apparatus 2. In the following operation explanation, a case where the user uses the image forming apparatus 2 by operating the display operation unit 23 of the image foraging apparatus 2 will be described.

The user operates the display operation unit 23 of the image forming apparatus 2, inputs a user ID and a password, and performs a user authentication request with respect to the image forming apparatus 2. The reception unit 200 of the image forming apparatus 2 receives a user authentication request (S1), along with the user ID and the password that are input.

The reception unit 200 transmits the user ID and the password received to the authentication server device 3 via the communication unit 22 and the network 5, and performs the user authentication request with respect to the authentication server device 3.

When the control section 30 of the authentication server device 3 receives the user authentication request via the communication unit 32, the control section 30 determines whether or not the user ID and the password received are registered in the user DB for authentication 311 (S2). If the user ID and the password are registered, an authentication is set to be established (S2: Yes), and if the user ID and the password are not registered, the authentication is set not to be established (S2: No) and the authentication results are notified to the image forming apparatus 2.

In a case where the reception unit 200 of the image forming apparatus 2 receives the authentication result notified from the authentication server device 3, if the result is that authentication is not established (S2: No), the reception unit 200 performs an error display or the display operation unit 23 (S3). In this case, the user cannot use the image forming apparatus 2.

In a case where the authentication result notified from the authentication server device 3 is that authentication is established (S2: Yes), the registration unit 201 determines whether or not the user ID received is registered in a user ID field 212a of the main tabulation table 212 (S4).

FIGS. 2A and 2B illustrate an example of the main tabulation table 212, FIG. 2A is a view illustrating before updating, and FIG. 2B is a view illustrating after updating. The user ID field 212a, a department code field 212b, a selection department code field 212e, and a additional flag field 212d are disposed in the main tabulation table 212.

In the user ID field 212a, if the user uses the image forming apparatus 2 even once, the user ID of the user is registered. The user ID registered in the user ID field 212a, for example, uses the same ID as the user ID used in the user DB for authentication 311. In a case where both are associated with each other, the user identifier different from the user ID for authentication may be used as the user ID for tabulation. In this case, the image forming apparatus 2 has the table (not illustrated) representing association between the user ID fin authentication and the user identifier, acquires the user identifier corresponding to the user ID for authentication based on the table, and registers the acquired user identifier in the user ID field 212a as the user for tabulation.

In a case where one user simultaneously belongs to plural departments, plural department codes are registered in the department code field 212b. The department code is an example of an organization identifier discriminating the organization. In cases illustrated in FIGS. 2A and 2B, since the user of the user ID "user A" belongs to both departments of the department code "department A" and the department code "department B", both of "department A" and "department B" are registered in the department code field 212b.

In a case where the user ID is "user A", "user 13", "user C", "the User D", and "user F", as illustrated in FIG. 2A, since the user ID is registered in the main tabulation table 212 (S4: Yes), any one is not registered in the additional flag field 212d. When these users use the image forming apparatus 1 for the first time, the registration unit 201 registers the department code corresponding to the department code field 212b, and registers "Yes" as an example of the flag information in the additional flag field 212d.

In a case where the user ID is "user F", as illustrated in FIG. 2A before updating, since the user ID is not registered is the main tabulation table 212 (S4: No), the registration unit 201, as illustrated in FIG. 2B after updating, registers "user E" of the user ID in the user ID field 212a (S5), registers "visitor" as an example of the information indicating that does not belong to any departments in the department code field 212b, and registers "Yes" (S6) as the example of the flag information indicating that adds the user ID in the additional flag field 212d.

In a case where the user ID is registered in the main tabulation table 212 (S4: Yes), the registration unit 201 determines whether or not the department code to which belongs is one (S7). In a case where the department codes to which belong are plural (S7: No), the registration unit 201 displays the plural department codes to which belong on the display operation unit 23, and causes the user to select one of the department codes (S8), For example, in a case where the user ID is "user A", if "department A" is selected of "department A" and "department B" of the department codes to which belong, the registration unit 201 registers "department A" of the selected department code in the selection department code field 212c.

Next, the reception unit 200 receives the job from the user (S9). That is, the user places plural original documents on an original document feeding tray of the auto document feeder device of the image forming apparatus 2, operates the display operation unit 23, and displays a menu screen on the display operation unit 23. The user selects an item related to the copying or the scanning from the menu screen, and instructs an execution of the copying job or the scanning job. There is a case where the user places a sheet of original document on the document stand, and selects the item related to the copying or the scanning from the menu screen.

The permission unit 202 determines whether or not the job that is received by the reception unit 200 is within a restriction, with reference to a restriction field 214b of the tabulation table for each user 214 illustrated in FIG. 4 (S10). For example, in a case where the user ID is "user E", as illustrated in the restriction field 214b of FIG. 4, the user ID is restricted only to black-and-white (S10: No). Therefore, in a case where the job is the color copying job or the color scanning job, the display to reject the execution of the job is performed on the display operation unit 23 (S11).

In a case where the job that is received by the reception unit 200 is within the restriction (S10: yes), the execution unit 204 controls the image input unit 24 or the image output unit 25, and executes the copying job or the scanning job (S12).

The tabulation unit 203 performs the tabulation processing tabulating the usage amounts of document executed by the execution unit 204 for each department or each user (S13). An example of results of the tabulation processing will be described with reference to FIGS. 3 and 4.

FIG. 3 is a view illustrating an example of a tabulation table for each department 213. FIG. 4 is a view illustrating an example of a tabulation table for each user 214. The department code field 213a, and a usage amount field 213b are disposed in the tabulation table for each department 213 illustrated in FIG. 3. The user ID field 214a, the restriction field 214b, and the usage amount field 214c are disposed in the tabulation table for each user 214 illustrated in FIG. 4. The restricted information previously set by a manager, is registered in the restriction field 214b. A case illustrated in FIG. 4 indicates that the copying, the scanning, and the printing of black-and-white is permitted. The restricted information may be the information that is not permitted.

The tabulation unit 203 registers a total usage number of each number of the copying, the scanning, and the printing for each department code in the usage amount field 213b of the tabulation table for each department 213 illustrated in FIG. 3. The copying, the scanning, and the printing may be separately registered, and the black-and-white and the color may be separately registered.

The tabulation unit 203 registers a total usage number of both of the copying and the scanning for each user ID in the usage amount field 214c of the tabulation table for each user 214 illustrated in FIG. 4.

Hereinbefore, although a case where the user operates the display operation unit 23 of the image forming apparatus 2 and uses the image forming apparatus 2 is described, a case where the user operates the terminal device 4 and uses the image forming apparatus 2 is processed in the same manner. This case instructs the printing job to the image forming apparatus 2.

Second Exemplary Embodiment

Figure 6:
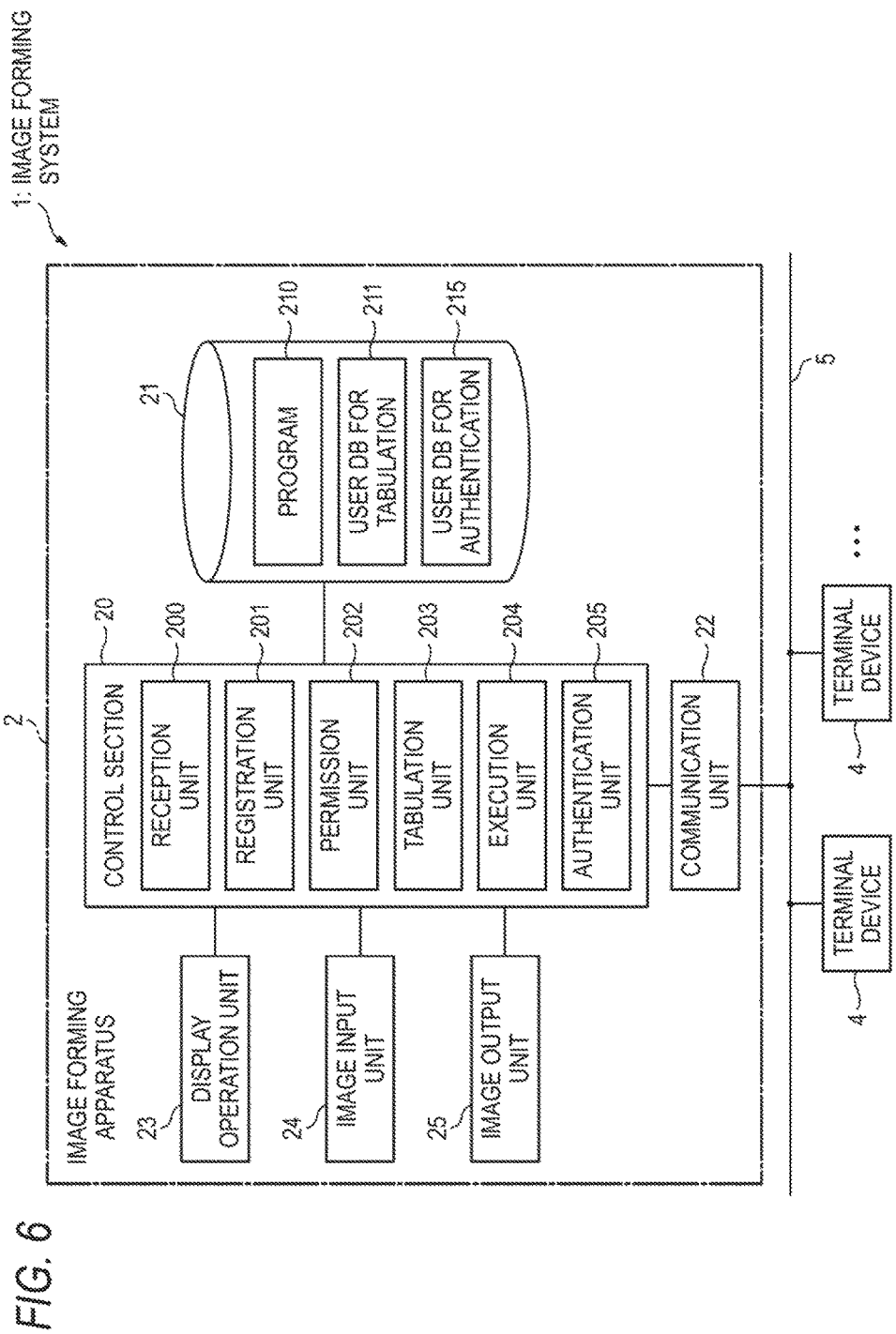
FIG. 6 is a block diagram illustrating a schematic configuration example of an image forming system according to a second exemplary embodiment of the invention.

FIG. 6 is a block diagram illustrating a schematic configuration example of an image forming system according to a second exemplary embodiment of the invention. Although the user DB for authentication 311 is managed by the authentication server device 3 in the first exemplary embodiment, the image forming apparatus 2 manages a user DR for authentication 215 and the user DB for tabulation 211 in the exemplary embodiment. Accordingly, the image forming apparatus 2 performs the authentication processing in the exemplary embodiment. Hereinafter, it will be described focusing on differences from the first exemplary embodiment.

In the image forming system 1, the image forming apparatus 2 and plural terminal devices 4 used by the user are connected to each other via the network 5. The image forming system 1 manages the user database for tabulation (DB) 211 tabulating the usage amounts of document and the user database for authentication (DB) 215 to authenticate the user by the image forming apparatus 2. The user DB for authentication 215 is the example of the first table.

The control section 20 of the image forming apparatus 2 is configured of the central processing unit (CPU) and the interface. The CPU operates in accordance with the program 210 stored in the storage unit 21. Therefore, the CPU functions as the reception unit 200, the registration unit 201, the permission unit 202, the tabulation unit 203, the execution unit 204, and the authentication unit 205.

The storage unit 21 of the image forming apparatus 2 is realized by the read only memory (ROM), the random access memory (RAM), and the hard disk, and stores the program 210, the user DB for tabulation 211, and the user DB for authentication 215.

The user DB for authentication 215 is the DB to manage the user information related to the user for each user ID, in the same manner as the user DB for authentication 311 of the first exemplary embodiment.

The reception unit 200 receives the user authentication request from the terminal device 4 or the display operation unit 23, and performs the user authentication request with respect to the authentication unit 205.

The authentication unit 205 determines whether or not the user ID and the password that the reception unit 200 receive are registered in the user DR for authentication 215. If the user ID and the password are registered, an authentication is set to be established, and if the user ID and the password are not registered, the authentication is set not to be established. Therefore the authentication results are informed to the reception unit 200.

Since an operation of another registration unit 201, another permission unit 202, another tabulation unit 203, and another execution unit 204 are the same as the first exemplary embodiment, the description will be omitted. Each of the reception unit 200, the registration unit 201, the permission unit 202, the tabulation unit 203, the execution unit 204, and the authentication unit 205 may be partially or entirely configured of the hardware circuit, such as the FPGA and the ASIC.

Another Exemplary Embodiment

The exemplary embodiment of the invention is not limited to the above exemplary embodiments, and various modifications can be executed within the scope not changing the gist of the invention. For example, although the user DR for tabulation 211 is managed by the image forming apparatus 2 in each of the above exemplary embodiments, the user DR for tabulation may be managed by a server side. In this case, the image forming apparatus 2 performs an inquiry to the authentication server device 3 that manages the user DB for tabulation or the server (not illustrated), and performs the tabulation.

Within the scope not changing the gist of the invention, it is possible to add, delete, change, or substitute the step in the flow of the exemplary embodiment. It may be provided to record the program used in the above exemplary embodiments on a computer-readable recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a memory that stores a second table tabulating a usage amount when a user uses an apparatus for each identifier for tabulation separately from a first table in which user information is registered for each identifier for authentication of the user;
and a CPU configured to function as:
a reception unit that receives a user identifier; and
a registration unit that registers the user identifier in the second table as an identifier for tabulation, when the received user identifier establishes an authentication by a verification in the identifier for authentication registered in the first table, and is not registered in the second table.

2. An image forming apparatus comprising:
a memory that stores a second table tabulating usage amounts of a document when a user uses an apparatus for each user identifier and each organization identifier, separately from a first table in which user information including the organization identifier of an organization to which the user belongs is registered for each user identifier of the users;
and a CPU configured to function as:
a reception unit that receives the user identifier;
a registration unit that registers the user identifier in the second table and registers information indicating the organization identifier of the user or that the user does not belong to any organization based on the user information in the second table, when the user identifier which is received by the reception unit establishes an authentication by a verification in the first table, and is not registered in the second table; and
a tabulation unit that performs tabulation processing of the usage amounts of a document with respect to the user identifier registered in the second table.

3. The image forming apparatus according to claim 2, further comprising:
a permission unit that permits use of the apparatus in a range of restricted information previously set with respect to the user identifier in which the information indicating not belonging to any organization is registered by the registration unit.

4. An image forming apparatus comprising:
a memory that stores a first table in which user information including an organization identifier of an organization to which a user belongs is registered for each user identifier of the user, and a second table tabulating usage amounts of a document when the user uses an apparatus for each user identifier and each organization identifier;
and a CPU configured to function as:
a reception unit that receives the user identifier;
an authentication unit that performs authentication processing by a verification of the first table in which the storage unit stores with respect to the user identifier which is received by the reception unit;
a registration unit that registers the user identifier in the second table and registers information indicating the organization identifier of the user or that the user does not belong to any organization based on the user information in the second table, when the user identifier which is received by the reception unit establishes an authentication by the authentication unit, and is not registered in the second table; and
a tabulation unit that performs tabulation processing of the usage amounts of a document with respect to the user identifier registered in the second table.

* * * * *